May 12, 1931.  A. F. SCHLAIS  1,805,419
GLARE SHADE FOR AUTOMOBILES
Filed Jan. 23, 1930
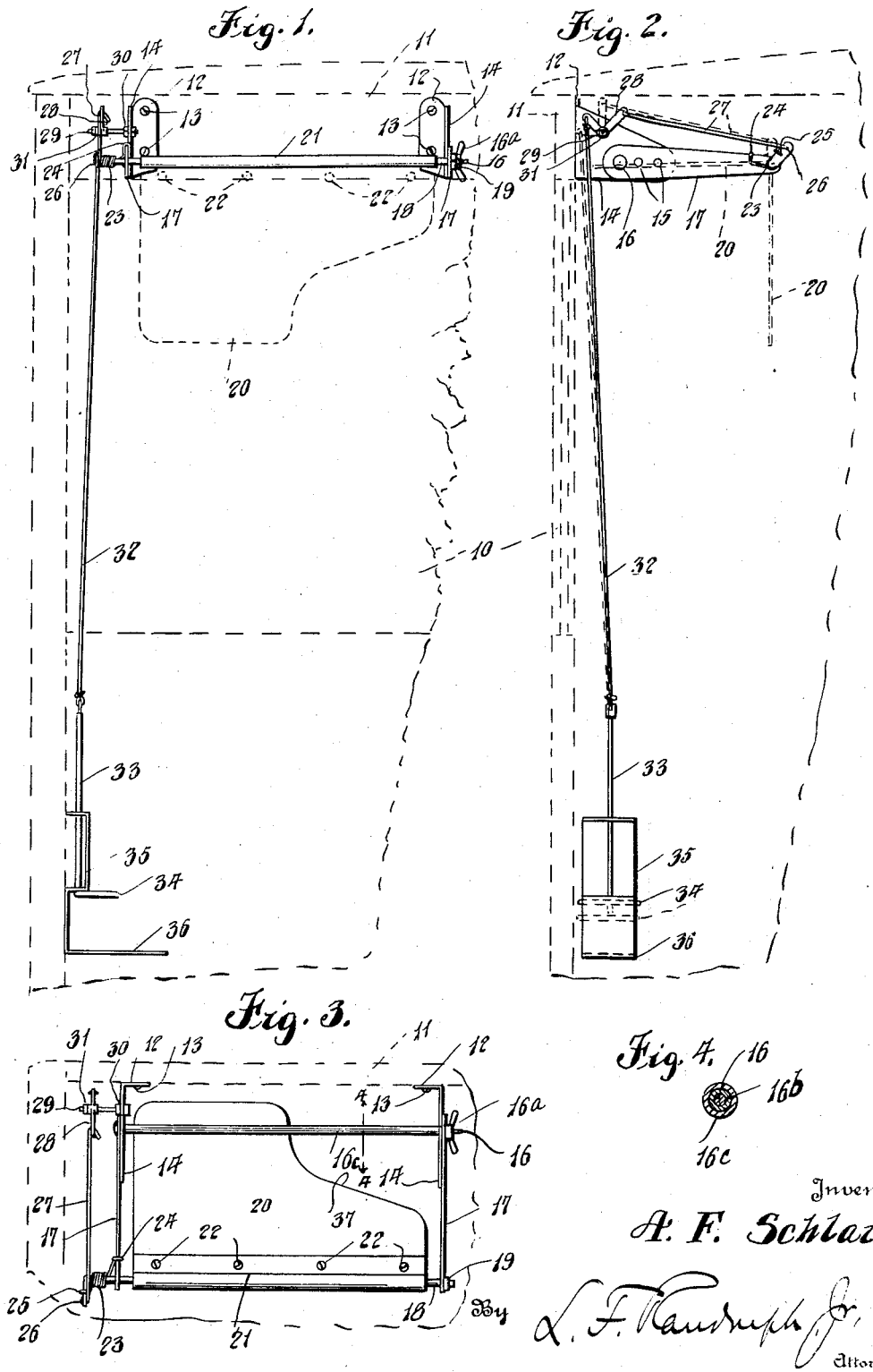
Inventor
A. F. Schlais,
By L. F. Randolph Jr.
Attorney Patented May 12, 1931

1,805,419

UNITED STATES PATENT OFFICE

ANTONEY F. SCHLAIS, OF IRONWOOD, MICHIGAN

GLARE SHADE FOR AUTOMOBILES

Application filed January 23, 1930. Serial No. 422,858.

This invention relates to a shade adapted for use on automobiles in order to nullify the effect of blinding headlights on approaching vehicles.

It is aimed to provide a construction which will not normally unduly obstruct the vision for the driver and one which may be rapidly operated so that a shade will intercept the vision at desirable times in order that the operator may drive close to the right hand side of the road without being blinded or confused by the approaching headlights.

It is further aimed to provide a novel construction which is readily adjustable, durable and inexpensive and capable of use as an attachment or as an initial installation on automobiles.

Various additional objects and advantages will become apparent from a consideration of the description following taken in connection with accompanying drawings illustrating an operative embodiment.

In said drawings:—

Figure 1 is a view showing the invention in front elevation in connection with an automobile and in the position in which it is viewed by the driver while seated, Figure 2 is a longitudinal sectional view through the automobile showing the improvements at a right angle to Figure 1, Figure 3 is a top plan view, and Figure 4 is a sectional detail on a plane indicated by the line 4—4 of Figure 3.

Referring specifically to the drawings, wherein like reference characters designate like or similar parts, 10 designates a conventional windshield of an automobile and 11 the top bar of the frame thereof. Fastened to the bar 11 on the inside of the automobile are a pair of brackets 12. Screws 13 may be used as the fastening means to secure said brackets rigidly to the frame member 11.

Longitudinal or rearward flanges 14 on said brackets 12 have longitudinal rows of openings 15 through which a fastening rod or bolt 16 is selectively passed according to the adjustment desired for the glare shield or shade. The bolt 16 holds bearing arms 17 which engage the outer surfaces of the flanges 14. A winged nut 16ª is screw threaded on the rod 16 and is adjustable to clamp the bearing arms 17 in the rigid position shown in the drawings, that is in frictional contact with the flanges 14. Rod 16 is enclosed within a metal tube 16ᵇ that provides means to space flanges 14, and the metal tube 16ᵇ is covered with a rubber tube 16ᶜ to provide a cushion to prevent rattle when the shade or shield, to be hereinafter described, is in raised position.

Journaled in the arms 17 at their outer free ends is a rock shaft 18, held in place by a nut 19 thereon. Rigidly fastened to the rock shaft 18 is a shade or shield 20, which may be a sheet of metal having one portion or flange 21 bent or curled over the shaft 18 and by means of bolts 22, rigidly clamped thereon. A coil spring 23 surrounds the shaft 18 and has one end fastened to one of the arms 17 as at 24 and the other end fastened as at 25 to a crank 26 on said shaft 18. The function of said spring 23 is to normally maintain the shade 20 in a raised or horizontal position as shown in the drawings.

In order to operate the shade 20 to a lowered position, shown in broken lines in Figures 1 and 2, from the normal horizontal position heretofore referred to, a link 27 is provided and pivoted to crank 26 and also pivoted to a bell crank lever 28 which is pivoted on a stud 29 in the form of a bolt, having nuts 30 securing it to one of the brackets 12 and nuts 31 on said stud securing the bell crank lever 28 in place. A draw element such as a wire or cable 32 is fastened to one arm of the bell crank 28 and is also fastened to a depressible rod 33 having a pedal 34 thereon. The rod 33 is guided in an offset portion 35 of a bracket 36 fastened adjacent the floor board of the automobile and preferably in position at the left hand side for engagement by the left foot of the operator.

The shade 20 may be of any desired material but as shown is of metal and accordingly opaque. However, it may be made of translucent material if desired. Especially when the shade is opaque as shown in the drawings, one portion or corner thereof as at 37 is preferably removed, to the end that when the shade is in the position opposite to that shown, the blinding rays from headlights of approaching vehicles will be excluded and the operator may view the road directly in front of the vehicle and to the right hand side thereof through the portion 37.

It will be realized that normally the device is in a horizontal position between the arms 17, as shown best in Figure 3 of the drawings where it does not obstruct the view of the driver. When it is desired to move the shade or shield 20 downwardly to vertical position, as shown in broken lines in Figures 1 and 2, the operator depresses the pedal 34 with his left foot, thereby moving the rod 33 and element 32 downwardly, rocking bell crank 28 and moving link 27 to the rear, thus correspondingly moving the crank 26 and rocking shaft 18. Upon release of the pedal 34, the spring 23 will immediately restore the shield 20 to the original horizontal position.

Various changes may be resorted to provided they fall within the spirit and scope of the invention.

I claim as my invention:—

A device of the class described comprising attaching brackets, bearing arms extending forwardly therefrom, a rod securing said bearing arms to the brackets, a rock shaft journaled in the arms adjacent their free ends, a shade carried by the rock shaft, draw means to operate the rock shaft to move the shade to operative position, and spring means surrounding the rock shaft and fastened thereto at one end and to one of the bearing arms at the other end normally urging the shade into contact with said rod.

In testimony whereof I affix my signature.

ANTONEY F. SCHLAIS.